United States Patent
Stevens

(10) Patent No.: US 7,628,972 B2
(45) Date of Patent: Dec. 8, 2009

(54) NANOSTRUCTURE DEVICES AND FABRICATION METHOD

(75) Inventor: Ramsey M. Stevens, Danville, CA (US)

(73) Assignee: Eloret Corporation, Sunnyvale, CA (US)

( * ) Notice: Subject to any disclaimer, the term of this patent is extended or adjusted under 35 U.S.C. 154(b) by 567 days.

(21) Appl. No.: 11/240,173

(22) Filed: Sep. 29, 2005

(65) Prior Publication Data

US 2009/0246400 A1    Oct. 1, 2009

Related U.S. Application Data

(60) Provisional application No. 60/615,369, filed on Oct. 1, 2004.

(51) Int. Cl.
    *C01B 31/26* (2006.01)
(52) U.S. Cl. .................. 423/445 R; 977/840; 977/842; 977/901
(58) Field of Classification Search ............ None
    See application file for complete search history.

(56) References Cited

U.S. PATENT DOCUMENTS

| | | | |
|---|---|---|---|
| 6,589,835 B2 | 7/2003 | Chang | |
| 6,759,653 B2 * | 7/2004 | Nakayama et al. | 250/306 |
| 6,827,979 B2 | 12/2004 | Mirkin et al. | |
| 7,033,647 B2 | 4/2006 | Tang et al. | |
| 7,144,287 B2 | 12/2006 | Guillorn et al. | |
| 2002/0001970 A1 | 1/2002 | Becker | |
| 2005/0191427 A1 | 9/2005 | Wade et al. | |
| 2005/0208304 A1 | 9/2005 | Collier et al. | |
| 2005/0260355 A1 * | 11/2005 | Weber et al. | 427/566 |

OTHER PUBLICATIONS

Delzeit et al., "Growth of Carbon Nanotubes by Thermal and Plasma Chemical Vapor Deposition Processes and Applications in Microscopy", Nanotechnology 2002, 13, pp. 280-284.
Stevens et al., "Carbon Nanotubes As Probes for Atomic Force Microscopy", Nanotechnology 2000, 11, pp. 1-5.
Stevens et al., "Improved Fabrication Approach For Carbon Nanotube Probe Devices", Appl. Phys. Lett. Nov. 2000, 77(21), pp. 3453-3455.

* cited by examiner

*Primary Examiner*—Melvin C Mayes
*Assistant Examiner*—Melissa Stalder
(74) *Attorney, Agent, or Firm*—Perkins Coie LLP

(57) ABSTRACT

An ion flux is directed to a carbon nanotube to permanently shape, straighten and/or bend the carbon nanotube into a desired configuration. Such carbon nanotubes have many properties that make them ideal as probes for Scanning Probe Microscopy and many other applications.

30 Claims, 8 Drawing Sheets

NANOSTRUCTURE DEVICES AND FABRICATION METHOD

This application claims priority to U.S. Provisional Patent Application Ser. No. 60/615,369, titled "Nanostructure Devices And Fabrication Method," filed Oct. 1, 2004 and incorporated herein by reference.

The invention described herein was made by a nongovernment employee, whose contribution was done in the performance of work under a NASA contract, and is subject to the provisions of Public Law 96517 (35 U.S.C. 202). This invention was made with Government support under contract NAS2-99092 awarded by NASA. The Government has certain rights in this invention.

BACKGROUND OF THE INVENTION

1. Field of the Invention

The present invention relates to scanning probe microscopy, and more specifically, it relates to techniques for controlling the orientation and morphology of carbon nanotubes, which have many uses, e.g., as probe tips for scanning probe microscopes.

2. Description of Related Art

One method for fabricating conventional scanning probe microscope (SPM) probes uses standard lithographic techniques and materials. The probes made by this method typically have a pyramidal tip shape and are fabricated from silicon. Some more specialized SPM probes are the etch sharpened conventional silicon probe and the adhesive or electrically fused attached carbon nanotube probes, directly grown nanotube probes and amorphous carbon spike probes.

The techniques and materials as defined by standard lithographic processes limit conventional probes. The materials typically used are silicon or silicon nitride. These materials are hard but brittle and can chip and wear relatively easily. The lithographic techniques as well as the materials limit the aspect ratio of these conventional probes. Lithographic techniques have a lower limit on feature size making it difficult to make high aspect ratio probes and more importantly the brittle material will break easily if the aspect ratio is too high such as with etch sharpened conventional probes or focused ion beam milled conventional probes.

The more specialized carbon nanotube tips take advantage of some of the useful properties of the carbon nanotube but the attachment or growth techniques have little control over shape and alignment of the nanotube. Amorphous carbon spike probes do not have the robust nature of carbon nanotubes and can break more easily.

SUMMARY OF THE INVENTION

An object of the invention is to provide methods for permanently shaping, straightening and/or bending a carbon nanotube or other nanostructure into a desired configuration through the application of an ion flux to the nanotube or nanostructure.

This and other objects will be apparent to those skilled in the art based on the disclosure herein.

The technique is generally referred to herein as "Ion Flux Molding" (IFM). Exemplary applications include forming probe tips for Atomic Force Microscopes and Scanning Probe Microscopes, as well as to shape the carbon nanotubes in nanotube antennas, nanotube tweezers and manipulators, nanotube actuators and nanotube lever arms or any other application using nanotubes or nanostructures that need to be molded, straightened or aligned. Carbon nanotubes are also used as field emitters, sensors, logic devices, and electrical contacts or interconnects. The technique is usable for shaping materials other than carbon, e.g., metals, metal alloys, polymers and ceramics.

Known techniques are used to allow placement or growth of nanotubes in desired locations; however, there has been no technique allowing precise control of the shape of a carbon nanotube and its alignment to a desired location or direction.

In general, the present technique of ion flux molding is applied to a nanotube that has been placed or grown in a desired location. A nanotube is exposed to a ion beam instrument or other ion beam source and the direction of the beam with respect to the nanotube causes the nanotube to bend in the direction of the ion source. A sharp bend can be created with a focused beam and a unidirectional ion field can straighten and impart a general directionality to the nanotube or nanotubes. A sharp bend in a nanotube can serve as a defect site that can act as a weak point to shorten the nanotube to that point or as a flex joint for a lever arm or actuator. By use of energetic ions, a nanotube can be bent into any desired configuration including three-dimensional structures.

BRIEF DESCRIPTION OF THE DRAWINGS

The accompanying drawings, which are incorporated into and form part of this disclosure, illustrate embodiments of the invention and together with the description, serve to explain the principles of the invention.

DETAILED DESCRIPTION OF THE INVENTION

Figure 1A:
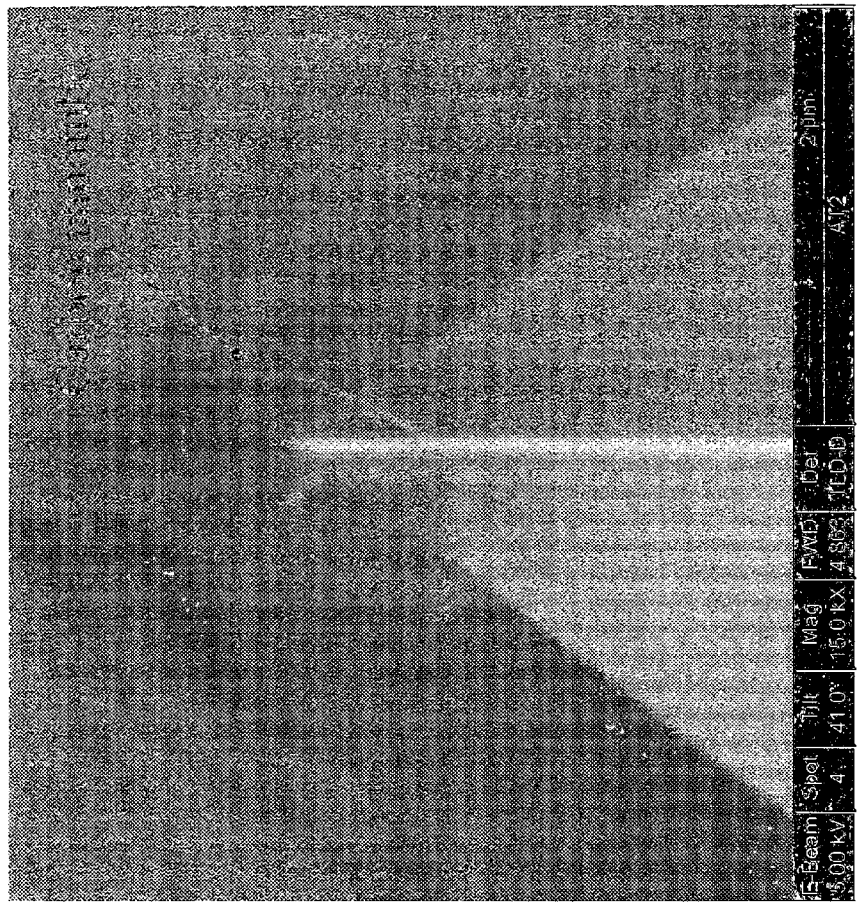
FIG. 1A illustrates a carbon nanotube having a curvature and without proper angular alignment.

The invention is a method for permanently shaping, straightening and/or bending a carbon nanotube into a desired configuration through the application of an ion flux to the nanotube. The technique is generally referred to herein as "Ion Flux Molding" (IFM). The carbon nanotube may be used, e.g., as a probe in an atomic force microscope (AFM) and in a scanning probe microscope (SPM). The probe dimensions for the AFM and SPM define the resolution and versatility of the instrument. As the diameter of the apex of the probe is reduced, the resolution of the probe is increased. The aspect ratio (length to width) of the probe defines the limitations on the types of samples that can be imaged accurately. Furthermore, the material out of which the probe is fabricated defines the imaging lifetime of the probe. The objective therefore is to make a probe with the smallest possible tip apex that has a high aspect ratio and is made of a highly wear resistant material. Carbon nanotubes have been proven to have many of these desired properties but it is difficult to control their orientation and morphology. This technique is used to straighten, bend or align a given nanotube into a desired configuration for use as an AFM or SPM probe. Other exemplary applications include the nanotube antenna, nanotube tweezers and manipulator, nanotube actuator and nanotube lever arm.

Techniques that allow placement or growth of nanotubes in desired locations are known in the art. For example, see (1) "Carbon nanotubes as probes for atomic force microscopy", Nanotechnology 11 (2000) 1-5; (2) "Improved Fabrication approach for carbon nanotube probe devices", Appl. Phys. Lett., vol. 77, number 21, November 2000; and (3) "Growth of carbon nanotubes by thermal and plasma chemical vapour deposition processes and applications in microscopy", Nanotechnology 13 (2002) 280-284. These three articles are incorporated herein by reference. Until now, there has been no technique that allows for precise control of the shape of a carbon nanotube and its alignment to a desired location or direction.

Generally, the method is applied to a nanotube that has been placed or grown in a desired location. A nanotube is exposed to an ion beam instrument or other ion beam source and the direction of the beam with respect to the nanotube causes the nanotube to bend in the direction of the ion source. A sharp bend can be created with a focused beam and a unidirectional ion field can straighten and impart a general directionality to the nanotube. A sharp bend in a nanotube can serve as a defect site that can act as a weak point to shorten the nanotube to that point or as a flex joint. By use of energetic ions a nanotube can be bent into any desired configuration including three-dimensional structures.

As briefly discussed above, a carbon nanotube can be used as the probe in an AFM and SPM. There are many known examples of the use of carbon nanotubes in these instruments as well as examples of techniques to attach, grow or otherwise locate a nanotube on the probing apparatus of the instrument. The example described below uses a known process to emplace a carbon nanotube for application of ion flux molding to the nanotube. By applying the IFM technique to existing nanotube scanning probes, the morphology and angle of the probe can be optimized.

Figure 1B:
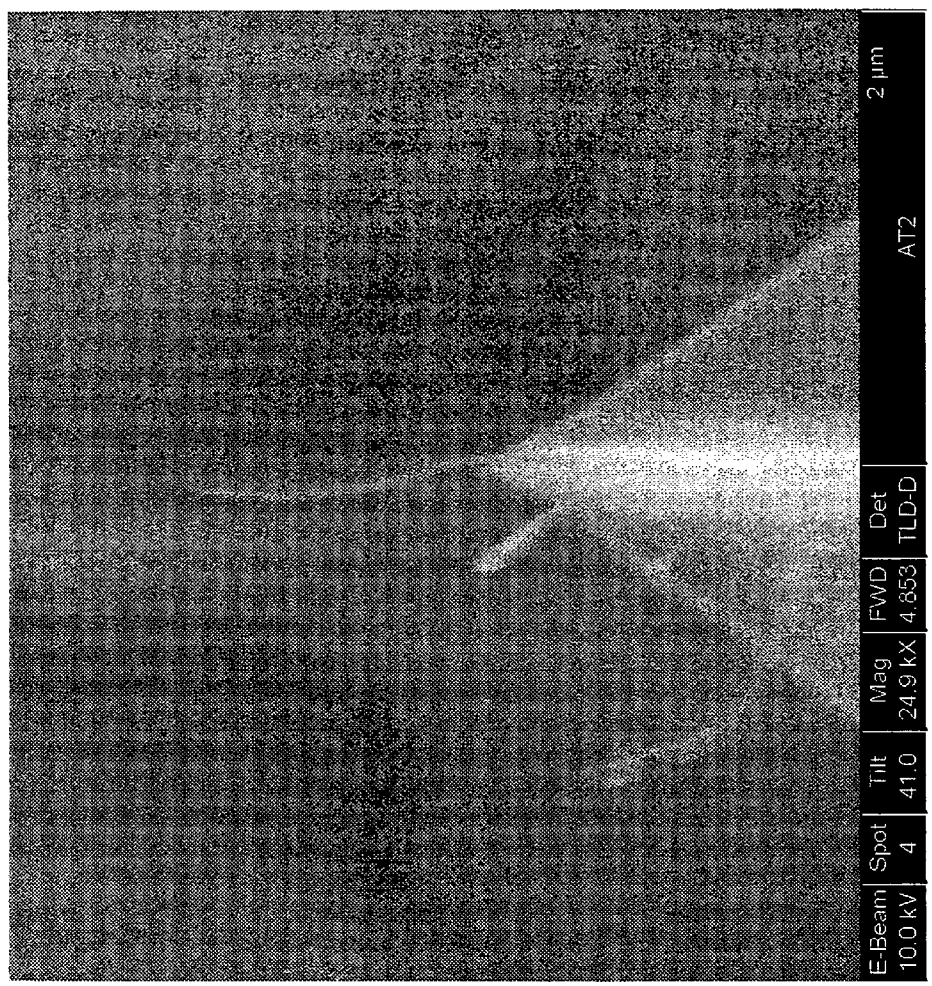
FIG. 1B shows the carbon nanotube of FIG. 1A halfway through IFM processing.
Figure 1C:
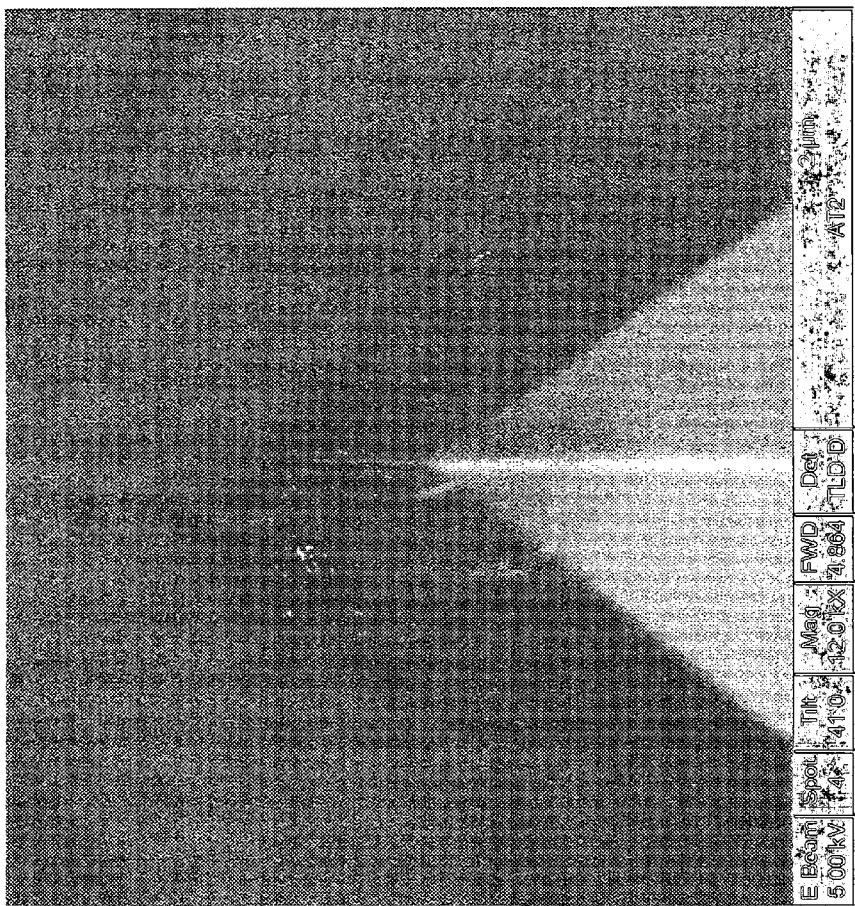
FIG. 1C shows the nanotube of FIGS. 1A and 1B straightened by exposure to an ion beam into a desired configuration.
Figure 2:
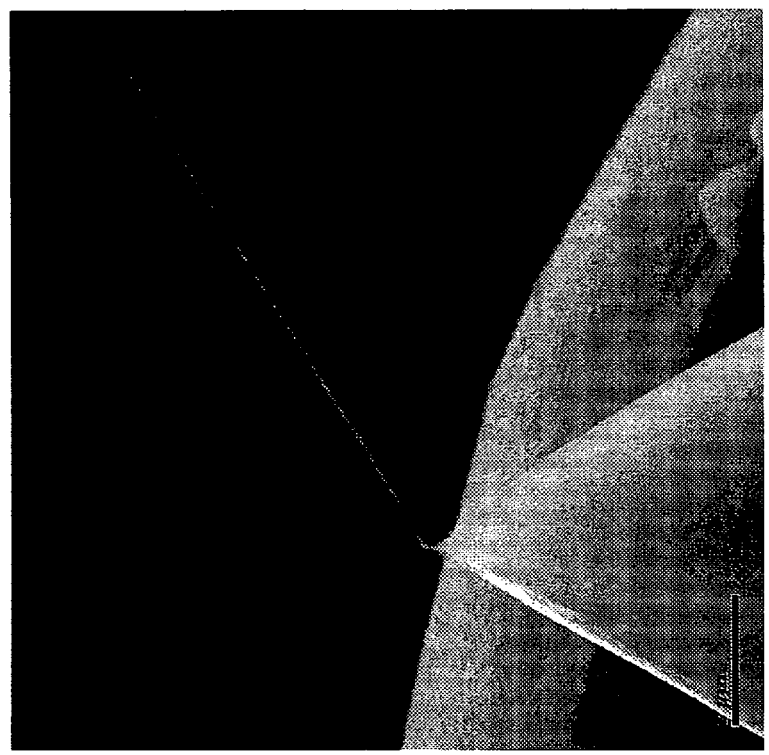
FIG. 2 shows a nanotube SPM probe bent in the direction from which an ion beam has been directed.
Figure 3:
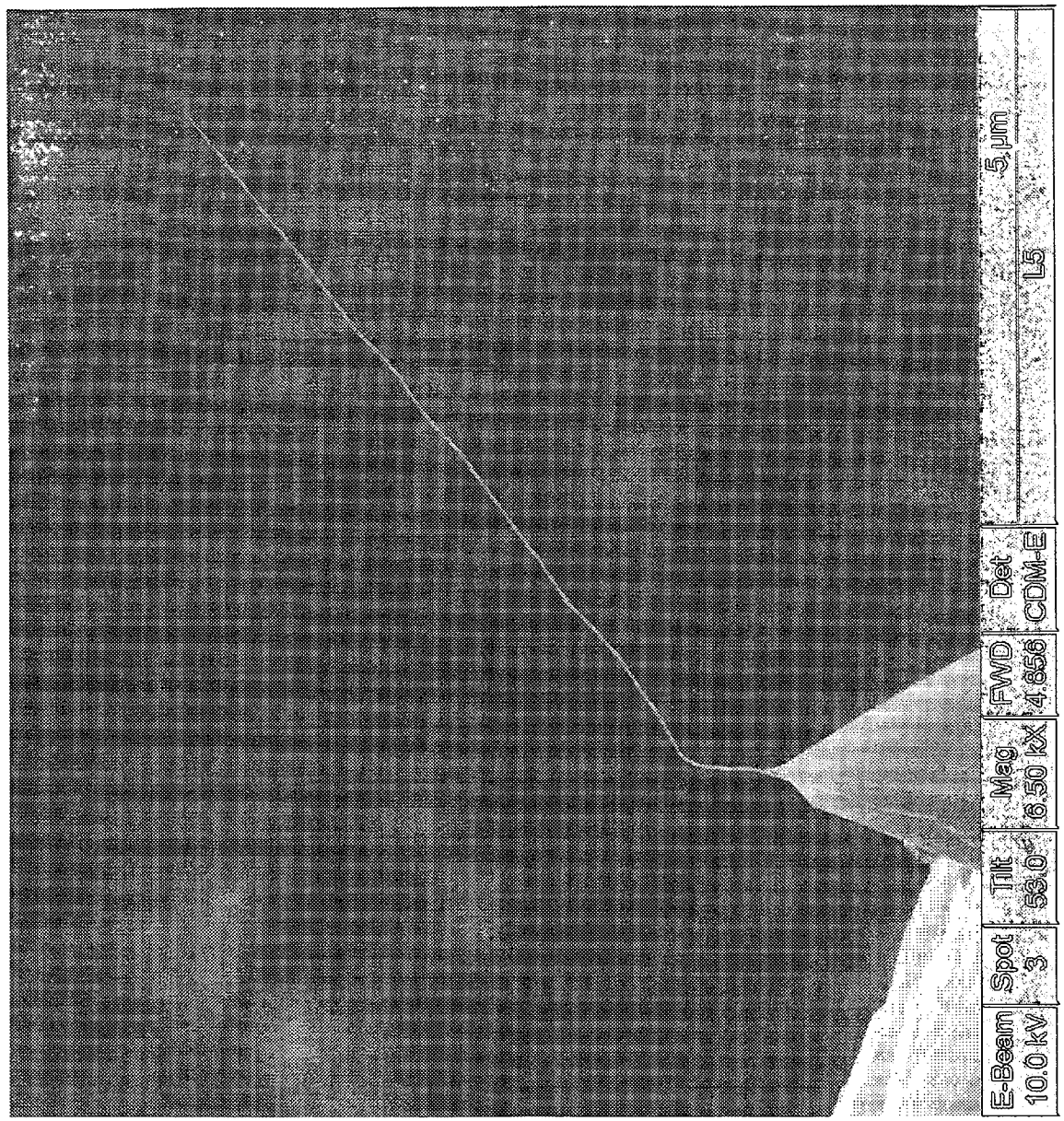
FIG. 3 shows a carbon nanotube with a single sharp bend.
Figure 4:
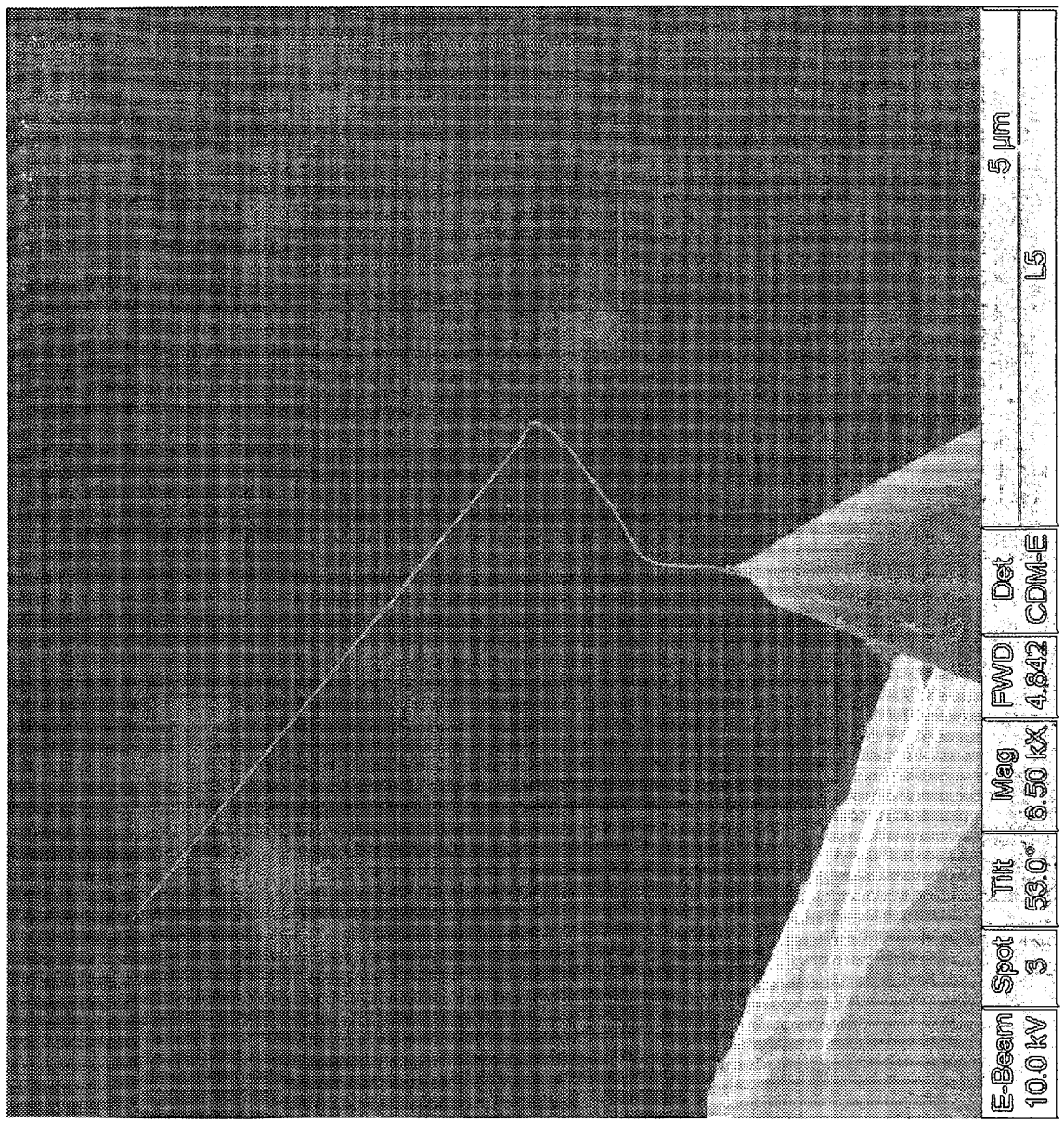
FIG. 4 shows a carbon nanotube with two sharp bends.
Figure 5:
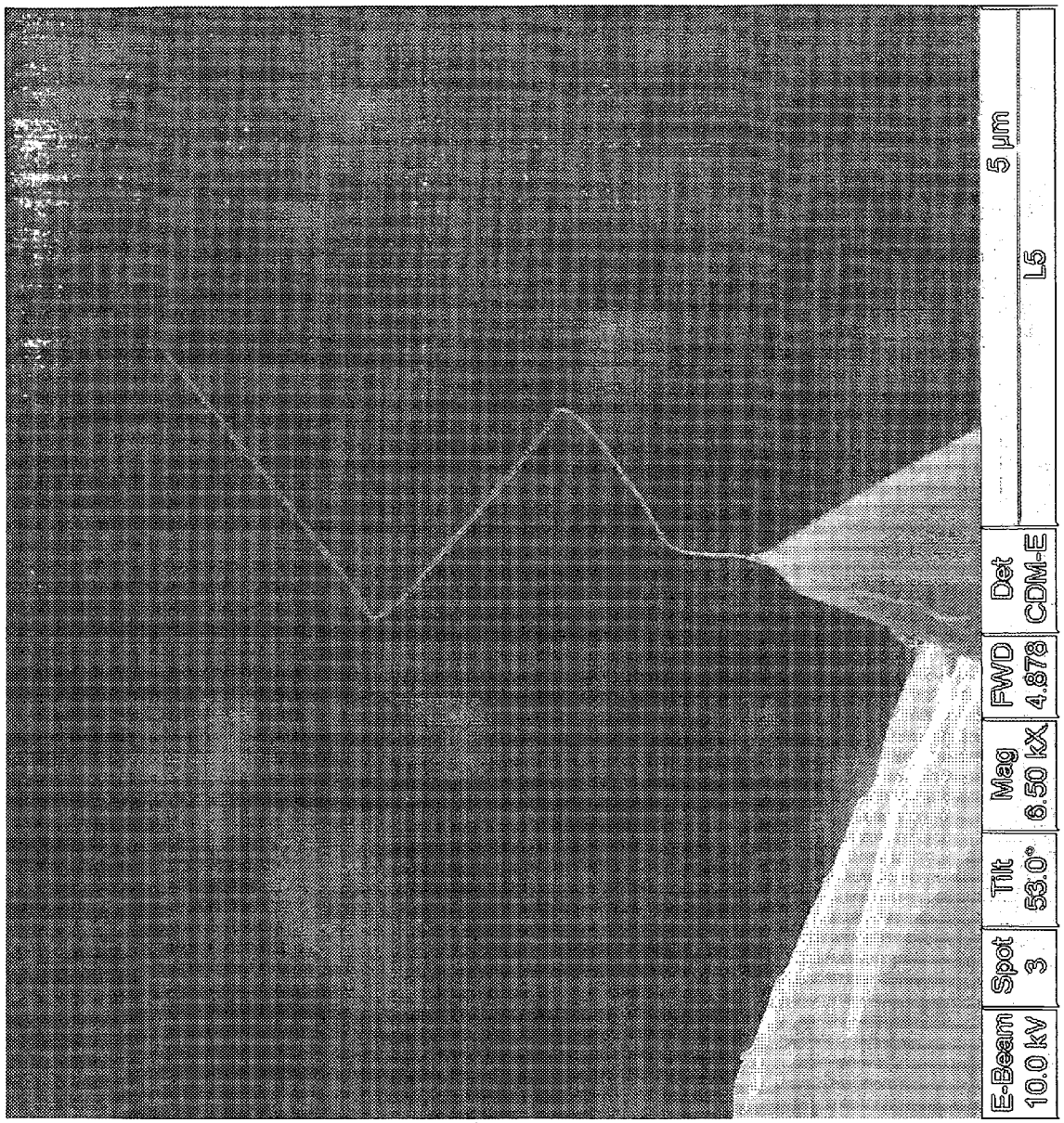
FIG. 5 shows a carbon nanotube with three sharp bends.
Figure 6:
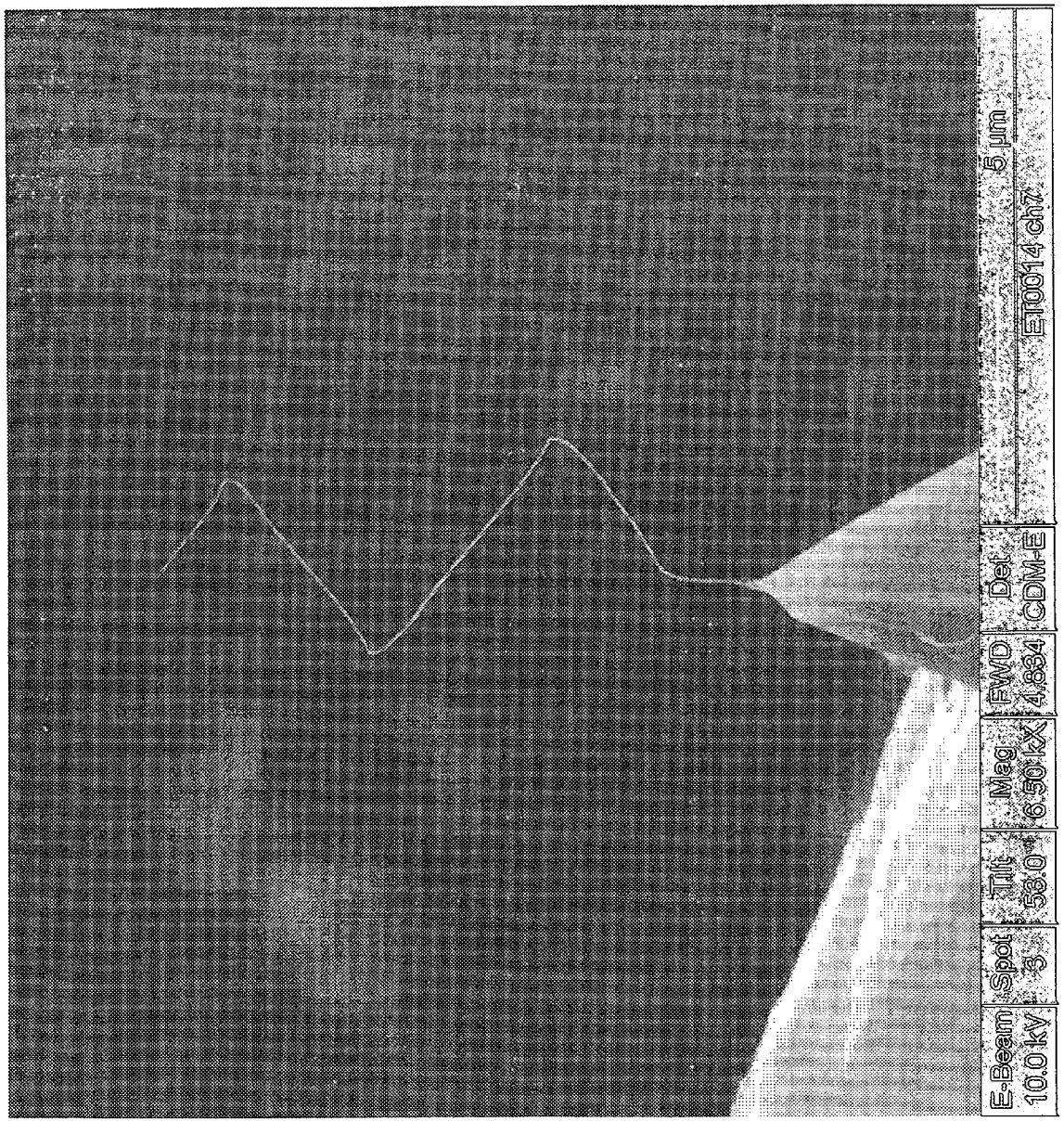
FIG. 6 shows a carbon nanotube with four sharp bends.

FIG. 1A shows a carbon nanotube having a curvature and without proper angular alignment. FIG. 1B shows the carbon nanotube of FIG. 1A halfway through IFM processing. FIG. 1C shows the nanotube of FIGS. 1A and 1B straightened by exposure to an ion beam into a desired configuration. FIG. 2 shows a nanotube SPM probe bent in the direction from which an ion beam has been directed. FIG. 3 shows a carbon nanotube with a single sharp bend. FIG. 4 shows a carbon nanotube with two sharp bends. FIG. 5 shows a carbon nanotube with three sharp bends. FIG. 6 shows a carbon nanotube with four sharp bends. Each of these sharp bends operates as a node for defining electromagnetic phenomena associated with the carbon nanotube. Such electromagnetic phenomena, as understood by people skilled in the art, enables the CNT to be used for photonic signal transmission and modulation.

In this example, carbon nanotubes were grown on a 1 cm length of Pt/Ir wire that was 1 mm in diameter. The wire was first immersed in an Fe containing solution and then underwent thermal CVD treatment by heating it to 750 C in the presence of Ethylene. Carbon nanotubes grow spontaneously under these conditions in the presence of the Fe catalyst. Note that nanotubes can be grown on almost any substrate that can withstand the growth temperature and catalysts can be any transition metal or other catalyst. Catalyst can be liquid phase, sputtered or evaporated onto a surface, in colloids or nanoparticle form or otherwise located onto a substrate.

Under observation through an optical microscope, the wire that contained the nanotubes and a scanning probe assembly are brought into close proximity. The wire and the tip are each connected to a terminal of a 110 V power supply. A nanotube is selected and brought into contact with the tip. A potential is applied and, at a sufficiently high current, the nanotube will fuse to the tip surface due to resistive heating at the nanotube-probe assembly junction. Although nanotubes have a high current carrying capacity, they also typically have defects and resistive heating also builds up at defect sites. The nanotube splits at such a site at sufficiently high currents. This process leaves a portion of the nanotube still on the wire and another portion attached to the probe assembly for use as a scanning probe The probe assembly with attached nanotube described above was fabricated and then inserted into a dual beam Focused Ion Beam instrument (see e.g., FEI Company). Dual beam systems have both an electron beam and an ion beam. The SEM function using the electron beam was used to locate the area of interest containing the nanotube. The angle and direction of the ion beam is defined with respect to the nanotube's location and the desired direction of the nanotubes final configuration. The nanotube was exposed to a gallium ion beam that raster scanned a 5 µm region containing the nanotube from a prescribed angle at 5 pA beam current for 5 sec. The angle of the nanotube changed from its native angle to be angled towards the direction of the source of ions. Native curvature and bends in the nanotube were removed such that the nanotube became straighter. By optimizing ion beam current, acceleration voltage, dwell time and beam density the nanotube can be more or less aggressively modified.

Note the existence of a variety of known techniques for placing the nanotube, e.g., nanotubes can be directly grown onto desired locations, or attached by glues, adhesives, electron beam deposition, ion beam deposition, etc. Note that a variety of configurations can be used for the Ion Beam Molding procedure. For example, a normal FIB instrument can be used. The FIB can be in the etch mode rather that in the raster scanning mode. The ion beam can be provided from other than a FIB instrument. The ion beam can be focused or diffuse. The Nanotube region can be flooded by a single beam or a plurality of beams. An ion beam or beams can be focused onto a region of the nanotube not encompassing the entire nanotube, thereby creating a bend or bends in the nanotube. A plurality of nanotubes can be simultaneously processed according to these techniques and multiple beams can be applied to one nanotube or one beam can be applied to multiple nanotubes. Where a plurality of beams are used, all can be at different angles or at the same angle, depending on the needs of a specific application. Ion beams can be produced from ions other than gallium. By optimizing ion beam current, acceleration voltage, dwell time and beam density, all to tailor the modification of the nanotube, any ion beam can be used in the present invention.

The present invention enables applications that require that a nanotube have a 3D configuration. The environment of the ion beam chamber can be vacuum or contain gas or vapor. Beam current and acceleration voltages can vary greatly and are coupled with exposure time. Where it is desired to modify a plurality of nanotubes, each nanotube can be modified incrementally with respect to the plurality or all can be modified at once depending on beam energy and exposure time. An individual nanotube can be modified stepwise or all at once.

The foregoing description of the invention has been presented for purposes of illustration and description and is not intended to be exhaustive or to limit the invention to the precise form disclosed. Many modifications and variations are possible in light of the above teaching. For example, the application describes the nanotubes but would also be applicable to any other nanostructure including: whiskers, rods, sheets, cones, etc. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. A method for molding a nanostructure into a desired configuration comprising:
   applying an ion flux from an ion source to a nanostructure, wherein the direction of said ion flux with respect to said nanostructure causes said nanostructure to bend in the direction of said ion source.

2. The method of claim 1, wherein said nanostructure comprises a carbon nanotube.

3. The method of claim 2, further comprising the step of providing said carbon nanotube.

4. The method of claim 3, wherein the step of providing said carbon nanotube is selected from the group consisting of placing said carbon nanotube in a desired location and growing said carbon nanotube in said desired location.

5. The method of claim 2, wherein the step of applying an ion flux comprises focusing said ion flux onto said carbon nanotube to create at least one sharp bend in said carbon nanotube.

6. The method of claim 5, further comprising breaking said carbon nanotube at said at least one sharp bend.

7. The method of claim 5, further comprising using said at least one sharp bend for defining electromagnetic phenomena.

8. The method of claim 2, wherein the step of applying an ion flux comprises straightening said carbon nanotube.

9. The method of claim 2, wherein the step of applying an ion flux comprises applying a unidirectional ion flux onto said carbon nanotube to impart directionality to said carbon nanotube.

10. The method of claim 1, wherein said ion flux comprises energetic ions.

11. The method of claim 1, wherein said ion source comprises a Focused Ion Beam (FIB) instrument.

12. The method of claim 11, wherein said FIB instrument comprises a dual beam FIB instrument having means for providing an electron beam and an ion beam.

13. The method of claim 12, further comprising locating an area of interest containing said carbon nanotube.

14. The method of claim 1, wherein said ion source comprises a gallium ion source.

15. The method of claim 4, wherein the step of placing said carbon nanotube in a desired location comprising attaching said carbon nanotube with an attachment mechanism selected from the group consisting of glue, adhesive, electron beam deposition and ion beam deposition.

16. The method of claim 11, further comprising operating said FIB instrument in a mode selected from the group consisting of an etch mode and a raster scanning mode.

17. The method of claim 1, wherein said ion flux is focused.

18. The method of claim 1, wherein said ion flux is diffuse.

19. The method of claim 1, wherein said ion flux comprises at least one ion beam.

20. The method of claim 19, wherein said nanostructure comprises at least one carbon nanotube.

21. The method of claim 1, wherein said ion source comprises operating parameters selected from the group consisting of ion beam current, acceleration voltage, dwell time and beam density, the method further comprising optimizing said operating parameters of said ion source to tailor the modification of said nanostructure.

22. A method for aligning a carbon nanotube (CNT) in a desired configuration, the method comprising:
   applying ion flux radiation from an ion source to a CNT to cause the CNT to bend in a direction relative to the applied ion flux radiation.

23. The method of claim 22, wherein the CNT is a single walled structure grown using a thermal chemical vapor deposition process.

24. The method of claim 22, wherein the CNT is a multi-walled structure grown using a thermal chemical vapor deposition process.

25. The method of claim 22, wherein the CNT is used as a probe in an atomic force microscope (AFM).

26. The method of claim 22, wherein a dual-beam structure is utilized to apply the ion flux radiation.

27. The method of claim 26, wherein the dual-beam structure includes an electron beam component and an ion beam component.

28. The method of claim 27, further comprising:
   locating an area of interest of the CNT using the electron beam component, wherein the area of interest corresponds to a location of the CNT where the ion flux radiation is to be applied; and
   applying the ion flux radiation using the ion beam component to change an angle of the CNT from a native angle to an angle corresponding to a direction of the ion flux radiation.

29. The method of claim 22, wherein the ion flux radiation is utilized to generate multi-directional CNT structures.

30. The method of claim 22, wherein the ion flux radiation is utilized to generate a plurality of sharp bends in the CNT, resulting in a multi-dimensional CNT structure.

* * * * *

UNITED STATES PATENT AND TRADEMARK OFFICE
CERTIFICATE OF CORRECTION

PATENT NO. : 7,628,972 B2  Page 1 of 1
APPLICATION NO. : 11/240173
DATED : December 8, 2009
INVENTOR(S) : Ramsey M. Stevens It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 969 days.

Signed and Sealed this

Second Day of November, 2010

David J. Kappos
*Director of the United States Patent and Trademark Office*